May 12, 1964
F. MÜLLER
3,132,916
COMBINED SPEED AND IDLING RECORDER FOR
AUTOMOTIVE VEHICLES AND THE LIKE
Filed Sept. 26, 1960
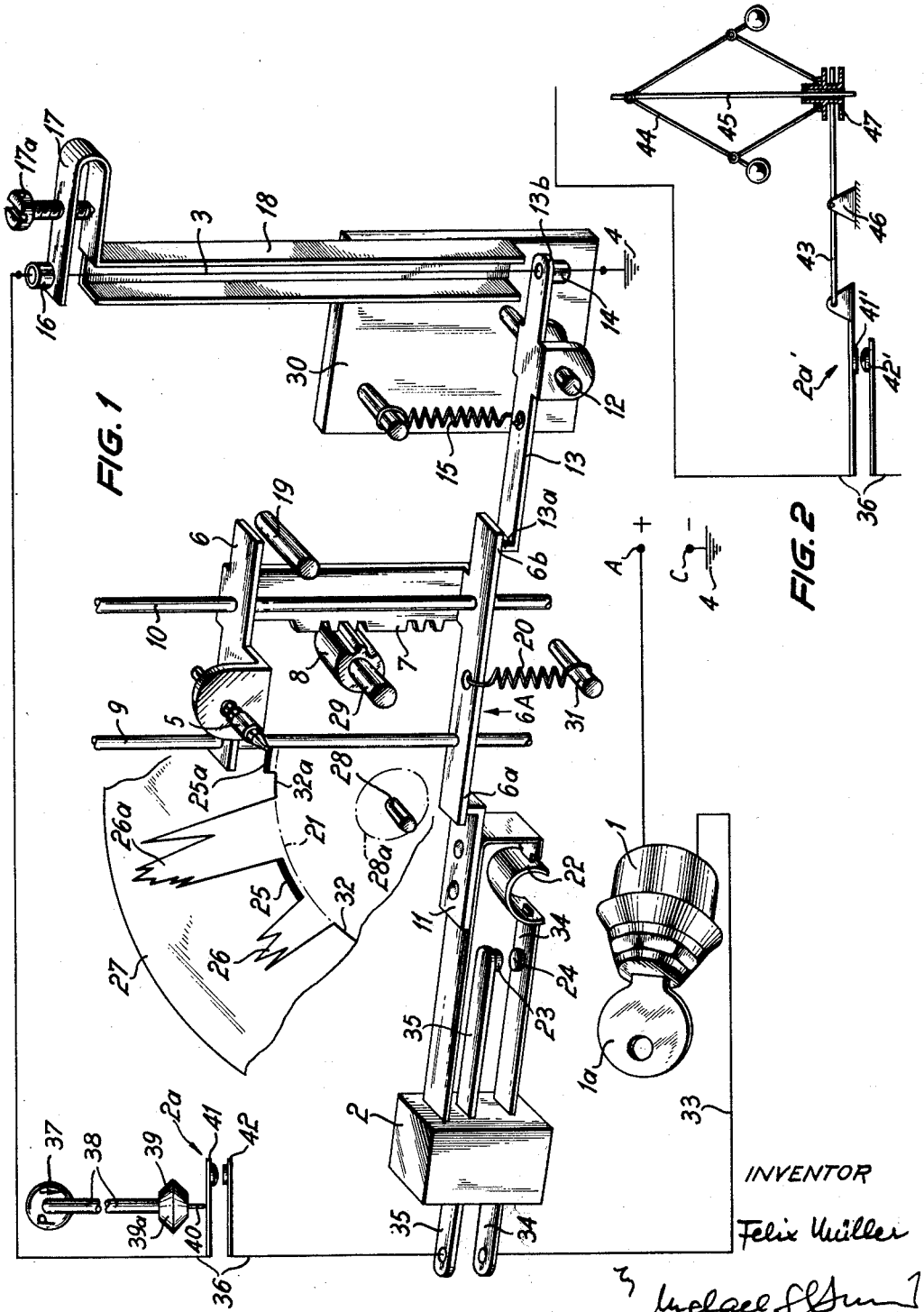
INVENTOR
Felix Müller

United States Patent Office 3,132,916
Patented May 12, 1964

3,132,916
COMBINED SPEED AND IDLING RECORDER FOR AUTOMOTIVE VEHICLES AND THE LIKE
Felix Müller, Schwenningen (Neckar), Germany, assignor to Kienzle Apparate G.m.b.H., Villingen, Black Forest, Germany
Filed Sept. 26, 1960, Ser. No. 58,279
Claims priority, application Germany Oct. 1, 1959
8 Claims. (Cl. 346—62)

The present invention relates to a speed recording device for use in automotive vehicles and the like, and more particularly to a speed recording device which embodies an arrangement for recording the intervals of time during which the engine is idling.

It is an important object of the present invention to provide a device which is capable of recording the intervals of time during which the engine is idling without requiring an additional stylus for such recordal.

It is another object of the present invention to provide a device of the just outlined characteristics wherein the speed recording stylus simultaneously serves as a means for recording the intervals of time during which the engine is idling.

A further object of the present invention is to provide a device for recording the intervals of time during which the engine is idling by utilizing the stylus of the speed recording instrument in such a way that the recorded matter is readily recognizable and distinguishable from other matter which is recorded on the same disk.

An additional object of the invention is to provide a combined speed and idling recorder for automotive vehicles and the like which is of very simple construction, which occupies little space, and which can be readily installed in all types of vehicles.

Still another object of the present invention is to provide a combined speed and idling recorder of the above outlined characteristics which may be conveniently adjusted to change the exact position and configuration of the curve indicating the intervals of idling.

The novel features which are considered as characteristic of the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

FIG. 1 is a schematic perspective view of a combined speed and idling recorder installed in a road vehicle; and FIG. 2 is a schematic view of a modified control switch arrangement for the circuit of the hot wire.

Referring now in greater detail to the drawings, and first to FIG. 1, there is shown a combined speed and idling recorder which comprises an electromechanical arrangement including an electric circuit in which is connected a current source with the plus terminal A, an ignition switch 1, an interrupter switch in the form of a toggle switch 2, a control switch assembly 2a, a hot wire 3, and a ground 4 with the minus terminal C. A recording member in the form of a pen arm or stylus 5 is mounted in a reciprocable frame 6 which is formed with or is rigidly connected to a toothed rack 7, the latter meshing with a pinion 8 mounted on a rotary shaft 29. This shaft 29 constitutes the revolving component of the speedometer and moves the stylus 5 of the combined speed and idling recorder through the rack and pinion drive 7, 8 so that the stylus records the speed indicating curves 26, 26a on the face of a rotary disk-shaped record receiving element 27. The latter is driven at a constant rate of speed by a moving means here shown as the shaft 28 of a clockwork mechanism 28a.

The frame 6 is reciprocable along a pair of parallel rod shaped guide elements 9, 10 so that it may move the stylus 5 with respect to the revolving disk 27. The free end of the rack 7 carries a bracket 6A which is also is also slidably mounted on the guide elements 9, 10 and which comprises an end portion 6a constituting an actuating member adapted to engage the flexible trip 11 of the toggle switch 2. The arrangement is such that the actuating member 6a of the bracket 6A engages with the trip 11 when the stylus 5 is in or near to its zero position, i.e. when the conveyance embodying the illustrated recorder is arrested and the engine is either idling or the ignition switch 1 is turned off. The second end portion or motion transmitting element 6b of the bracket 6A then engages with one arm 13a of a spring biased two-armed lever 13 which is rockable about a fixed pivot member 12, the latter being mounted on a stationary part 30 of the vehicle, e.g. the instrument panel. The other arm 13b of the lever 13 carries an eye 14 into which is soldered the lower end of the hot wire 3. A helical tensioning spring 15 operates between the stationary part 30 and the arm 13a in such manner as to permanently bias the lever 13 in clockwise direction and to thereby tension the hot wire 3. A second tensioning means in the form of a leaf spring 17 is connected to an eye 16 soldered to the upper end of the hot wire 3 and is integral with or connected to a channel-shaped protecting housing 18 which is carried by the stationary part 30 and which surrounds the hot wire 3. Thus, both ends of the hot wire 3 are subjected to the expanding or stretching force of the resilient members 15 and 17.

A fixed stud shaped abutment member or stop 19 is located in the path of the reciprocable frame 6 and arrests the stylus 5 in an end position corresponding to zero speed of the vehicle. As shown, the frame 6 is permanently biased into abutment with the stop 19 by a return or resorting spring 20 which operates between the bracket 6A and a fixed pin 31. Thus, excepting when the ignition switch 1 is on and the frame 6 is shifted by the rack and pinion drive 7, 8 to move in upward direction, as viewed in the drawing, or when the bracket 6A is acted upon by the arm 13a of the lever 13 in a manner to be fully described hereinafter, the frame 6 will abut against the stop 19 and the stylus 5 will move to its zero position to record arcuate lines 32, 32a along the zero circle 21 of the continuously revolving disk 27 to thereby indicate that the ignition switch 1 is off and that the engine is at a standstill. As is well known in the art, the disk 27 carries suitable graduations so that one can determine the length of intervals 32, 32a during which the switch 1 was turned off by the key 1a, the length of intervals represented by the speed recording curves 26, 26a, and the length of intervals represented by the curves 25, 25a.

When the ignition switch 1 is on and the engine idles, the spring 20 urges the frame 6 into abutment with the stop 19, whereby the end portion 6a of the bracket 6A acts against the trip 11 which causes the arcuate spring 22 of the toggle switch 2 to snap into another end position and to thereby advance the movable terminal 24 into contact with the stationary terminal 23 of the toggle switch 2 so that the circuit of the hot wire 3 is completed. In such position of the terminal 24, an electric current may flow through a conductor 33 which connects the ignition switch 1 with the flexible support 34 of the terminal 24, through the support 35 of the terminal 23, through a second conductor 36 connecting the support 35 of the terminal 23 with the eye 16, through the hot wire 3 and through the eye 14, and to the ground 4. It should be noted that the length of the hot wire 3 in unheated condition is selected in such a way that this wire pivots the lever 13 against the bias of the spring 15 to such an extent as to move the arm 13a from the path of the motion transmitting element 6b and to permit a movement of the frame 6 into abutment with the stop 19. However, as soon as the circuit of the hot wire 3 is completed by turning on the ignition switch 1, the wire 3 is heated and expands to permit a clockwise movement of the lever 13 under the action of the tensioning spring 15 so that the arm 13a acts against the motion transmitting element 6b of the bracket 6A and moves the frame 6 in a direction away from the stop 19, i.e., against the bias of the restoring spring 20. The stylus 5 then records a short dash whose length equals the thickness of the heavy arcuate line 25a on the record receiving disk 27. However, as the bracket 6A moves under the bias of the tensioning spring 15, i.e., under the action of the lever arm 13a, the actuating end portion 6a moves away from the trip 11 and permits the spring 22 to return to the position which is shown in the drawing so that the terminal 24 moves away from the terminal 23 and the toggle switch 2 interrupts the flow of current from the conductor 33 to the conductor 36. This causes a cooling and a reduction in the length of the wire 3 so that the lever 13 is pivoted in anticlockwise direction against the bias of the spring 15 and moves the arm 13a from the path of the motion transmitting element 6b. The spring 20 is now free to return the frame 6 into abutment with or in a direction toward the stop 19, and the stylus 5 will record a short dash whose length again equals the thickness of the heavy line 25a on the disk 27. The spring 20 thereby causes the bracket end portion 6a to deflect the trip 11 and to again close the toggle switch 2 so as to complete the circuit of the wire 3 and to bring about a renewed expansion of this wire and consequent movement of the frame 6 in a direction away from the stop 19. Such reciprocatory movement of the frame 6 and of the stylus 5 is repeated as long as the engine idles, whereby the stylus 5 records a zig-zag curve consisting of closely adjacent dashes which in their entirety form the heavy arcuate line 25a. As is shown in the drawing, the line 25a which indicates idling may be slightly spaced from the zero circle 21 because the positioning of the trip 11 is preferably such that it will snap the spring 22 shortly before the frame 6 reaches the fixed stop 19. The heavy zig-zag line 25a is known as a "beam." In the illustrated example, the record receiving disk 27 indicates that the engine of the conveyance was shut off for a period of time represented by the length of the line 32 extending along the zero circle 21, that the conveyance was then in motion and was advanced for a period of time and at speeds respectively indicated by the length and by the configuration of the curve 26, that the engine was idling for a period of time represented by the heavy line 25, that the conveyance was then again in motion as represented by the curve 26a, that the engine was shut off for a period of time indicated by the line 32a on the zero circle 21, and that the engine was idling for a period of time represented by the heavy line 25a. It will be seen that the configuration of the heavy lines 25, 25a renders it possible to determine with a glance at the disk 27 when and for how long the engine was idling.

Of course, when the conveyance is in motion, the actuating end portion 6a of the bracket 6A is always spaced from the trip 11 so that the switch 2 remains open. Also, it will be readily understood that the force of the tensioning spring 15 is greater than the force of the restoring spring 20 so that the bracket 6A and the frame 6 will be shifted in upward direction, as viewed in the drawing, when the motion transmitting element 6b is acted upon by the lever arm 13a. The normal position of the hot wire 3 and hence of the lever 13 may be varied by a tension adjusting screw 17a which is screwed into one half and whose tip engages the other half of the U-shaped leaf spring 17.

An important advantage of the improved speed and idling recorder is that the speed recording stylus 5, which would perform no useful function when the engine is idling, is utilized for the recordal of idling times. Thus, the customary vibrating stylus, not shown, which records certain other operations need not be burdened with recordal of idling times and, in addition, the diagram on the rotary disk 27 is easy to read since the curves indicating the speed (26, 26a), the standstill of the engine (32, 32a) and the idling times (25, 25a) are applied in the same sequence in which the events represented by these curves actually occur, i.e., a person checking the diagram on the disk 27 can note at a glance that a given interval during which the vehicle was in motion was followed by an interval of idling or by an interval of time during which the engine was shut off, and so forth.

The control switch 2a, which is an optional but very advantageous element of the improved recording device and is inserted in the path of electric current between the toggle switch 2 and the hot wire 3, is operable by the oil in the lubricating system of the engine when the latter is started. As shown, the lubricating system comprises a fluid pump 37 which is operated by the shaft of the engine, not shown, as soon as the engine is started after the ignition key 1a is turned on. The pump 37 causes a fluid under pressure to flow in the conduit 38 leading to a diaphragm housing 39 whose diaphragm 39a is connected with a pin shaped trip 40 so that the latter acts against the flexible terminal 41 of the control switch 2a and moves the same into contact with the stationary terminal 42 whereby the circuit of the hot wire 3 is completed provided, of course, that the ignition switch 1 is already on and that the terminals 23, 24 of the toggle switch 2 conduct current to the wire 36. The switch 2a constitutes a control means in that it insures that the circuit of the hot wire 3 can be completed only when the engine is actually started. It could occur that the ignition switch 1 is turned on but the engine is not started; in such instances, and if the control switch 2a were omitted, the stylus 5 would indicate idling though the engine would not run at all. However, by providing a control switch which is actually operable by the running engine and thus completes the circuit of the hot wire 3 only when the engine is actually running, the stylus 5 can record idling only when the engine is not arrested and when the vehicle is not in motion.

FIG. 2 illustrates a modified control switch 2a' which is also operated by the running engine but wherein the terminals 41', 42' may be moved into current-conducting contact with each other by a lever 43 connected to a centrifugal governor 44 which is mounted for rotation with a shaft 45. The latter may represent the shaft of the internal combustion engine or a shaft which is set in rotary motion as soon as the engine is started. As shown, the two-armed lever 43 has one of its ends connected with the flexible terminal 41' and is pivotable about the axis of a fixed bracket or bearing member 46. The other end of the lever 43 is connected with a collar 47 secured to the governor 44 and slidable along the rotary driven shaft 45. When the shaft 45 rotates, the governor 44 moves the collar 47 in upward direction, as viewed in FIG. 2, so that the left-hand end of the lever 43 establishes contact between the terminals 41', 42'. Thus, the centrifugal control switch 2a' can be moved to its closed position only after the ignition switch 1 is on and after the engine is started. It can be said that the switches 2a, 2a' constitute a control means which is responsive to rotation of the engine to complete the circuit of the hot wire 3 only when the engine is running and only when the ignition switch 1 is on.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a speed recorder for automotive vehicles and the like, in combination, record receiving means; means for moving said record receiving means; a speed recording member adapted to record the speed on said record receiving means; means for permanently biasing said recording member to a zero position; and an electromechanical arrangement responsive to the operation of the engine for reciprocating said recording member when the engine of the vehicle is running and the vehicle is not in motion so that said recording member is in the proximity of said zero position whereby the recording member records on the moving record receiving means a zig-zag curve indicative of the intervals of time during which the engine is idling.

2. In a speed recorder for automotive vehicles and the like, in combination, record receiving means; means for rotating said record receiving means; a speed recording member adapted to record the speed on said record receiving means; means for permanently biasing said recording member to a zero position; an electromechanical arrangement responsive to the operation of the engine for reciprocating said recording member when the engine of the vehicle is running and the vehicle is not in motion so that said recording member is in the proximity of said zero position, whereby the recording produced by the recording member on the rotating record receiving means is indicative of the intervals of time during which the engine is idling; and means for automatically inactivating said electromechanical arrangement when the vehicle is in motion and when the engine of the vehicle is not running.

3. In an automotive vehicle including an engine and ignition switch means for said engine, a combined speed and idling recorder comprising, in combination, a rotary record receiving element; means for rotating said element; a recording member in contact with said record receiving element and arranged to record thereon a curve; means for permanently biasing said recording member to a zero position; speedometer means including a shaft operatively connected with and actuating said recording member whereby the latter moves from said zero position and records on said element a portion of said curve which is indicative of the speed when the vehicle is in motion; and an electromechanical arrangement responsive to the operation of the engine for actuating said recording member in such a manner that the latter records on said element a portion of said curve which is indicative of the intervals of time during which the engine is idling, said arrangement comprising a frame connected to and reciprocable with said recording member, an electric circuit including said ignition switch means, a source of electrical energy, an interrupter switch, a hot wire, and spring biased means connected with said hot wire and adapted to move said frame and said recording member from said zero position when said hot wire expands, said frame closing said interrupter switch when said recording member is moved to said zero position and said ignition switch is on whereby the circuit is completed and said hot wire expands so that said spring biased means moves the frame away from said interrupter switch and the latter opens said circuit causing said wire to cool whereby the wire contracts to move said spring biased means away from said frame and said biasing means is free to move said recording member to said zero position and to thereby again close said interrupter switch.

4. In an automotive vehicle including an engine and ignition switch means for said engine, a combined speed and idling recorder comprising, in combination, a rotary record receiving disk; means for rotating said disk at a constant rate of speed; a recording stylus in permanent contact with said disk and arranged to record thereon a curve; a return spring for permanently biasing said stylus to a zero position; speedometer means including a shaft operatively connected with and actuating said stylus whereby the latter moves from said zero position and records on said disk a portion of said curve which is indicative of the speed when the vehicle is in motion; and an electromechanical arrangement responsive to the operation of the engine for actuating said stylus in such a manner that the latter records on said disk a portion of said curve which is indicative of the intervals of time during which the engine is idling, said arrangement comprising a frame connected to and reciprocable with said stylus, an electric circuit including said ignition switch means, a source of electrical energy, an interrupter switch, a hot wire, and a spring biased lever connected with said hot wire and adapted to move said frame and said stylus from said zero position when said hot wire expands, said frame closing said interrupter switch when said stylus is moved to said zero position and said ignition switch is on whereby the circuit is completed and said hot wire expands so that said lever moves the frame away from said interrupter switch and the latter opens said circuit causing said wire to cool whereby the wire contracts to move said lever away from said frame and said return spring is free to move said stylus to said zero position and to thereby again close said interrupter switch.

5. In an automotive vehicle including an engine and ignition switch means for said engine, a combined speed and idling recorder comprising, in combination, a rotary record receiving element; means for rotating said element; a recording member in contact with said record receiving element and arranged to record thereon a curve; means for permanently biasing said recording member to a zero position; speedometer means including a shaft operatively connected with and actuating said recording member wereby the latter moves from said zero position and records on said element a portion of said curve which is indicative of the speed when the vehicle is in motion; and an electromechanical arrangement responsive to the operation of the engine for actuating said recording member in such a manner that the latter records on said element a portion of said curve which is indicative of the intervals of time during which the engine is idling, said arrangement comprising a frame connected to and reciprocable with said recording member, an electric circuit including said ignition switch means, a source of electrical energy, an interrupter switch, a hot wire, a control switch, an operative connection between said control switch and said engine for closing said control switch when the engine is running, and spring biased means connected with said hot wire and adapted to move said frame and said recording member from said zero position when said hot wire expands, said frame closing said interrupter switch when said recording member is moved to said zero position and said ignition switch is on whereby the circuit is completed and said hot wire expands so that said spring biased means moves the frame away from said interrupter switch and the latter opens said circuit causing said wire to cool whereby the wire contracts to move said spring biased means away from said frame and said biasing means is free to move said recording member to said zero position and to thereby again close said interrupter switch.

6. In an automotive vehicle including an engine and ignition switch means for said engine, a combined speed and idling recorder comprising, in combination, a rotary record receiving element; means for rotating said element; a recording member in contact with said record receiving element and arranged to record thereon a curve; means for permanently biasing said recording member to a zero position; speedometer means including a shaft operatively connected with and actuating said recording member whereby the latter moves from said zero position and records on said element a portion of said curve which is indicative of the speed when the vehicle is in motion; and an electromechanical arrangement responsive to the operation for actuating said recording member in such a manner that the latter records on said element a portion of said curve which is indicative of the intervals of time during which the engine is idling, said arrangement comprising a frame connected to and reciprocable with said recording member, an electric circuit including said ignition switch means, a source of electrical energy, an interrupter switch, a hot wire, an oil switch, an operative connection between said oil switch and said engine for closing said oil switch when the engine is running, and spring biased means connected with said hot wire and adapted to move said frame and said recording member from said zero position when said hot wire expands, said frame closing said interrupter switch when said recording member is moved to said zero position and said ignition switch is on whereby the circuit is completed and said hot wire expands so that said spring biased means moves the frame away from said interrupter switch and the latter opens said circuit causing said wire to cool whereby the wire contracts to move said spring biased means away from said frame and said biasing means is free to move said recording member to said zero position and to thereby again close said interrupter switch.

7. In an automotive vehicle including an engine and ignition switch means for said engine, a combined speed and idling recorder comprising, in combination, a rotary record receiving element; means for rotating said element; a recording member in contact with said record receiving element and arranged to record thereon a curve; means for permanently biasing said recording member to a zero position; speedometer means including a shaft operatively connected with and actuating said recording member whereby the latter moves from said zero position and records on said element a portion of said curve which is indicative of the speed when the vehicle is in motion; and an electromechanical arrangement responsive to the operation of the engine for actuating said recording member in such a manner that the latter records on said element a portion of said curve which is indicative of the intervals of time during which the engine is idling, said arrangement comprising a frame connected to and reciprocable with said recording member, an electric circuit including said ignition switch means, a source of electrical energy, an interrupter switch, a hot wire, a centrifugal switch, an operative connection between said centrifugal switch and said engine for closing said centrifugal switch when the engine is running, and spring biased means connected with said hot wire and adapted to move said frame and said recording member from said zero position when said hot wire expands, said frame closing said interrupter switch when said recording member is moved to said zero position and said ignition switch is on whereby the circuit is completed and said hot wire expands so that said spring biased means moves the frame away from said interrupter switch and the latter opens said circuit causing said wire to cool whereby the wire contracts to move said spring biased means away from said frame and said biasing means is free to move said recording member to said zero position and to thereby again close said interrupter switch.

8. In an automotive vehicle including an engine and ignition switch means for said engine, a combined speed and idling recorder comprising, in combination, a rotary record receiving element; means for rotating said element; a recording member in contact with said record receiving element and arranged to record thereon a curve; means for permanently biasing said recording member to a zero position; speedometer means including a shaft operatively connected with and actuating said recording member whereby the latter moves from said zero position and records on the rotating record receiving element a portion of said curve which is indicative of the speed when the vehicle is in motion; and an electromechanical arrangement responsive to the operation of the engine for actuating said recording member in such a manner that the latter records on said element a portion of said curve which is indicative of the intervals of time during which the engine is idling, said arrangement comprising a reciprocable frame connected with said recording member, an electric circuit including said ignition switch means, a source of electrical energy, an interrupter switch, a hot wire, adjustable means for tensioning said hot wire, and spring biased means connected with said hot wire and adapted to move said frame and said recording member from said zero position and substantially radially of said element when said hot wire expands, said frame closing said interrupter switch when said recording member is moved to said zero position and said ignition switch is on whereby the circuit is completed and said hot wire expands so that said spring biased means moves the frame away from said interrupter switch and the latter opens said circuit causing said wire to cool whereby the wire contracts to move said spring biased means away from said frame and said biasing means is free to move said recording member to said zero position and to thereby again close said interrupter switch.

References Cited in the file of this patent

UNITED STATES PATENTS

| | | |
|---|---|---|
| 1,414,910 | Watson | May 2, 1922 |
| 1,484,125 | Frazer | Feb. 19, 1924 |
| 1,878,004 | Smith | Sept. 20, 1932 |
| 2,864,603 | Bauer | Dec. 16, 1958 |
| 3,004,818 | Delfs | Oct. 17, 1961 |